US008452743B2

(12) United States Patent
Vasudevan et al.

(10) Patent No.: US 8,452,743 B2
(45) Date of Patent: May 28, 2013

(54) METHOD AND SYSTEM FOR EFFICIENT ENFORCEMENT OF DERIVED LOCKS IN A HIERARCHICAL STRUCTURE

(75) Inventors: Ramesh Vasudevan, Los Altos, CA (US); Anjani K. Prathipati, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 446 days.

(21) Appl. No.: 12/562,633

(22) Filed: Sep. 18, 2009

(65) Prior Publication Data

US 2011/0071993 A1    Mar. 24, 2011

(51) Int. Cl.
*G06F 7/00*    (2006.01)
*G06F 17/00*    (2006.01)

(52) U.S. Cl.
USPC ............................ 707/704; 707/781; 711/145

(58) Field of Classification Search
USPC ........ 707/704, E17.059, 781, 999.8; 711/145
See application file for complete search history.

(56) References Cited

U.S. PATENT DOCUMENTS

| | | | | |
|---|---|---|---|---|
| 5,063,501 A * | 11/1991 | Jordan, Jr. | ...................... | 710/200 |
| 5,063,503 A * | 11/1991 | Jordan, Jr. | ...................... | 710/200 |
| 7,535,475 B2 * | 5/2009 | Sorotokin et al. | ............ | 345/581 |
| 2005/0144330 A1 * | 6/2005 | Richardson | ........................ | 710/1 |
| 2005/0234989 A1 * | 10/2005 | Bailey et al. | ............... | 707/104.1 |
| 2006/0004758 A1 * | 1/2006 | Teng et al. | ......................... | 707/9 |
| 2007/0097138 A1 * | 5/2007 | Sorotokin et al. | ............ | 345/581 |
| 2011/0055182 A1 * | 3/2011 | Buban et al. | ................... | 707/704 |

OTHER PUBLICATIONS

Haustein, Michael, et al., "An efficient infrastructure for native transactional XML processing", Data & Knowledge Engineering, vol. 61, © 2007, pp. 500-523.*
Bächle, Sebastian, et al., "Implementing and Optimizing Fine-Granular Lock Management for XML Document Trees", DASFAA 2009, LNCS 5463, Brisbane, Queensland, Australia, Apr. 21-23, 2009, pp. 631-645.*
Preston, Jon A., et al., "An Efficient Synchronous Collaborative Editing System Employing Dynamic Locking of Varying Granularity in Generalized Document Trees", CollaborationCom 2006, Atlanta, GA, Nov. 17-20, 2006, pp. 1-10.*
Haustein, Michael P., et al., "A Lock Manager for Collaborative Processing of Natively Stored XML Documents", SBBD 2004, Brasilia, Brazil, Oct. 18-20, 2004, pp. 230-244.*
Bächle, Sebastian, et al., "Tailor-made Lock Protocols and their DBMS Integration", SETMDM '08, Nantes, France, Mar. 29, 2008, pp. 18-23.*
Saha, Deepa, et al., "A Self-Adjusting Multi-Granularity Locking Protocol for Object-Oriented Databases", ICADIWT '09, London, UK, Aug. 4-6, 2009, pp. 832-834.*
Haustein, Michael P., et al., "DeweyIDs—The Key to Fine-Grained Management of XML Documents", SBBD 2005, Uberlandia, MG, Brazil, Oct. 3-7, 2005, pp. 85-99.*

* cited by examiner

*Primary Examiner* — Hares Jami
(74) *Attorney, Agent, or Firm* — Vista IP Law Group, LLP

(57) ABSTRACT

An improved approach is described for handling locks and locking for hierarchical structures. The approach efficiently captures lock information for hierarchical nodes as well as for the enforcement of derived locks. Support is provided for locking of leaf nodes as well as for locking of intermediate nodes.

19 Claims, 37 Drawing Sheets

Figure 3

| Node ID | Nearest Locked Ancestor | Self Lock |
|---------|------------------------|-----------|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

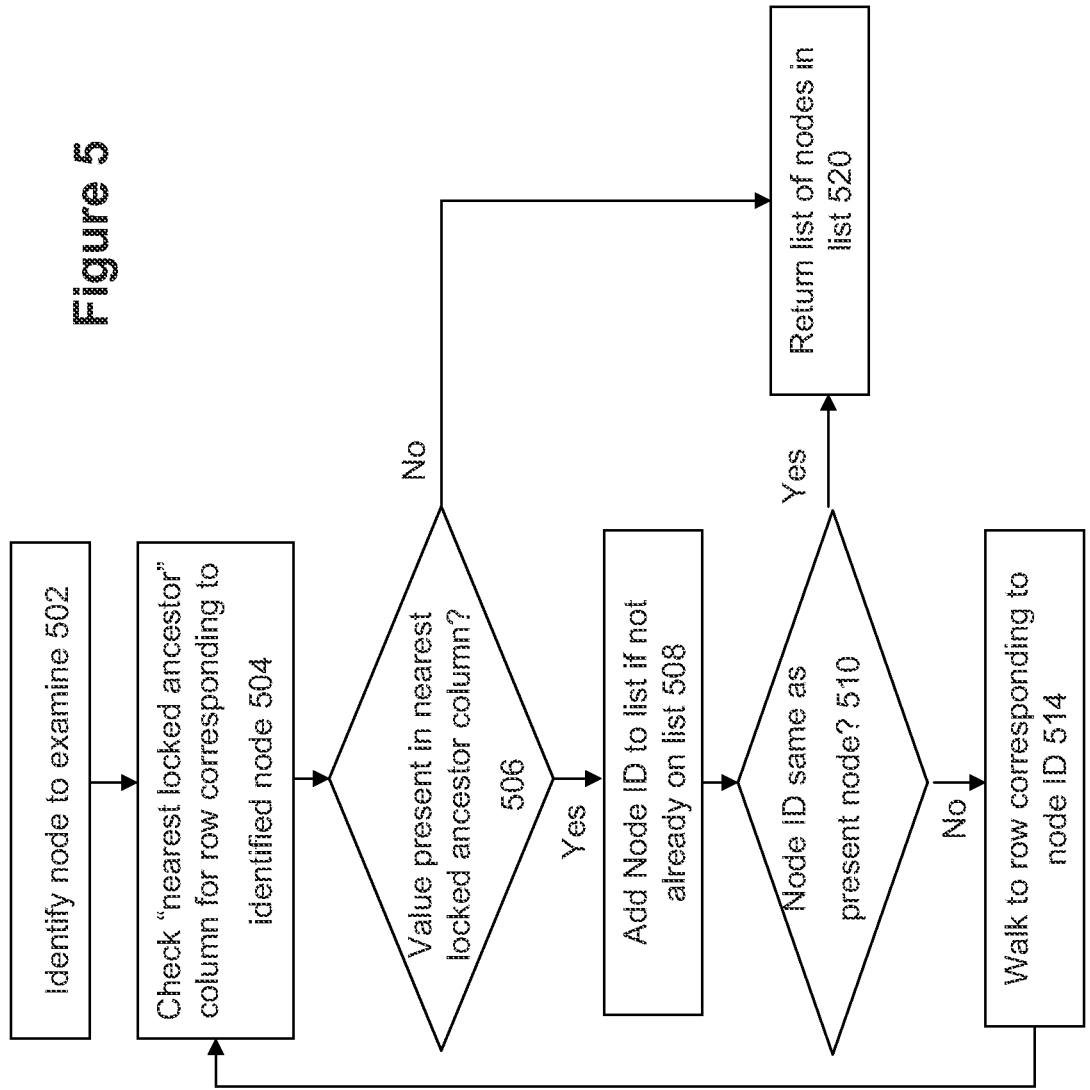

Figure 6A

| Node ID | Nearest Locked Ancestor | Self Lock |
|---|---|---|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

← Identify Node to examine

| Effective Lock List |  |
|---|---|
|  |  |

Figure 6B

| Node ID | Nearest Locked Ancestor | Self Lock |
|---------|------------------------|-----------|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

Check value of "nearest locked ancestor" column

| Effective Lock List |  |
|---------------------|--|
|                     |  |

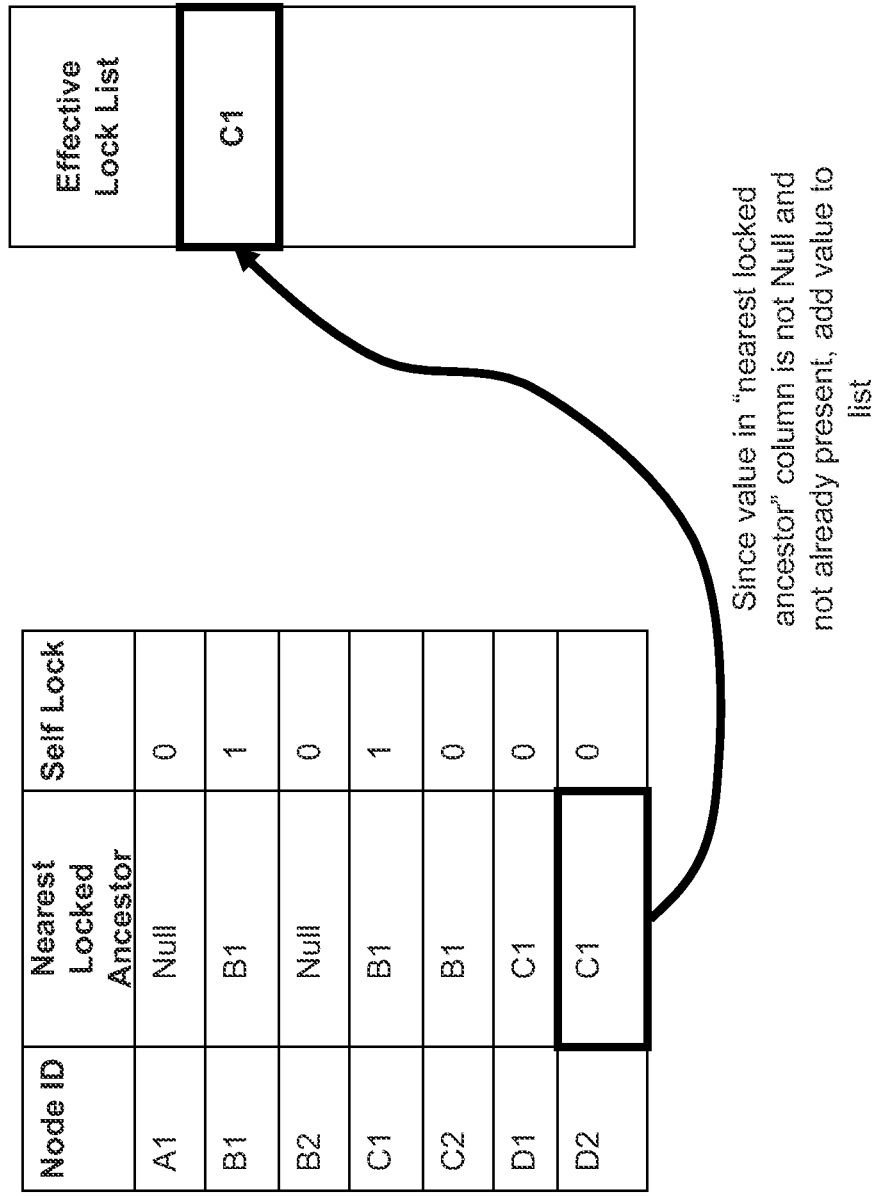

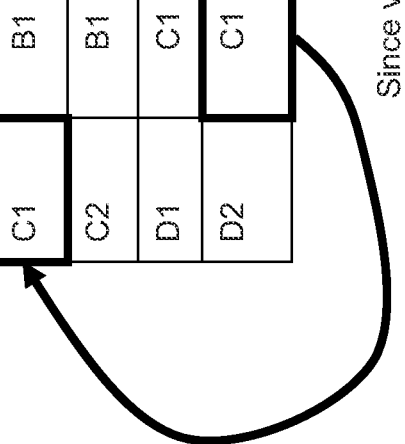

Figure 6E

| Node ID | Nearest Locked Ancestor | Self Lock |
|---|---|---|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

Check value of "nearest locked ancestor" column

| Effective Lock List |  |
|---|---|
| C1 |  |

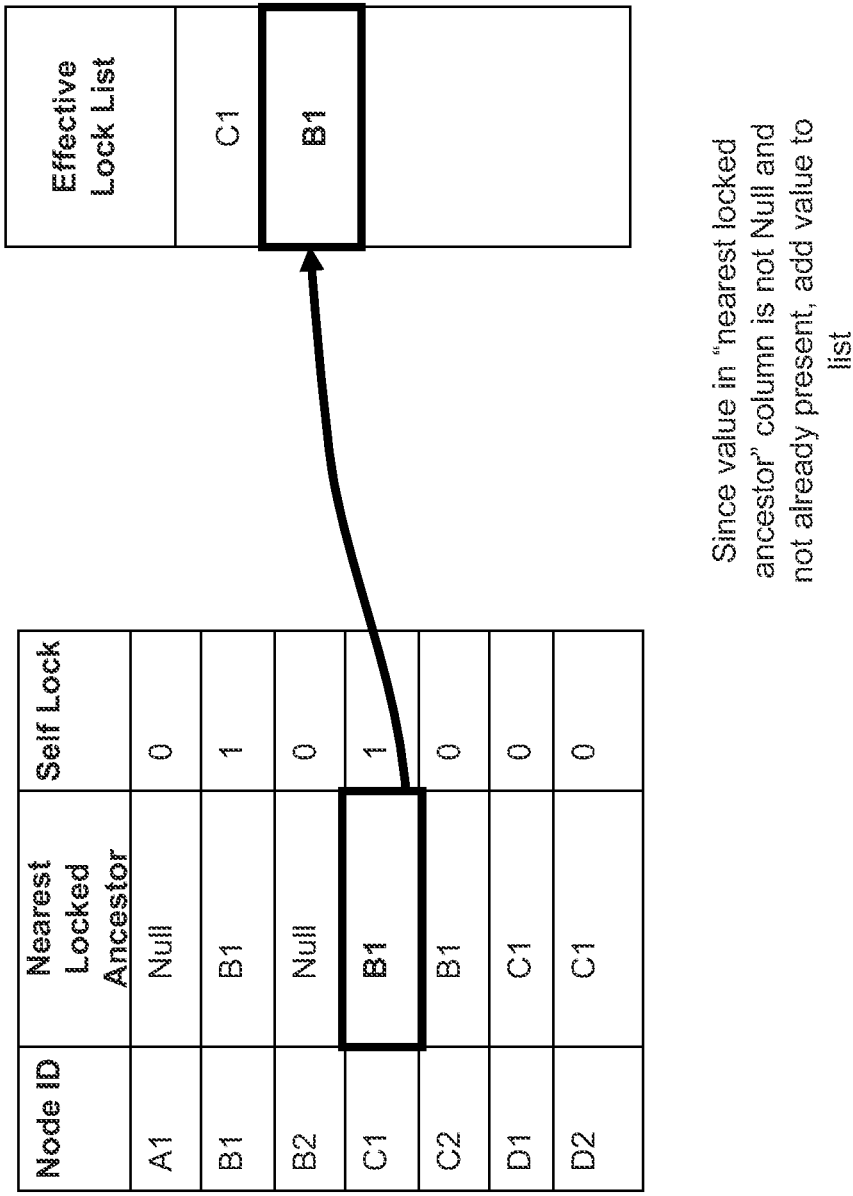

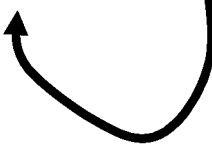

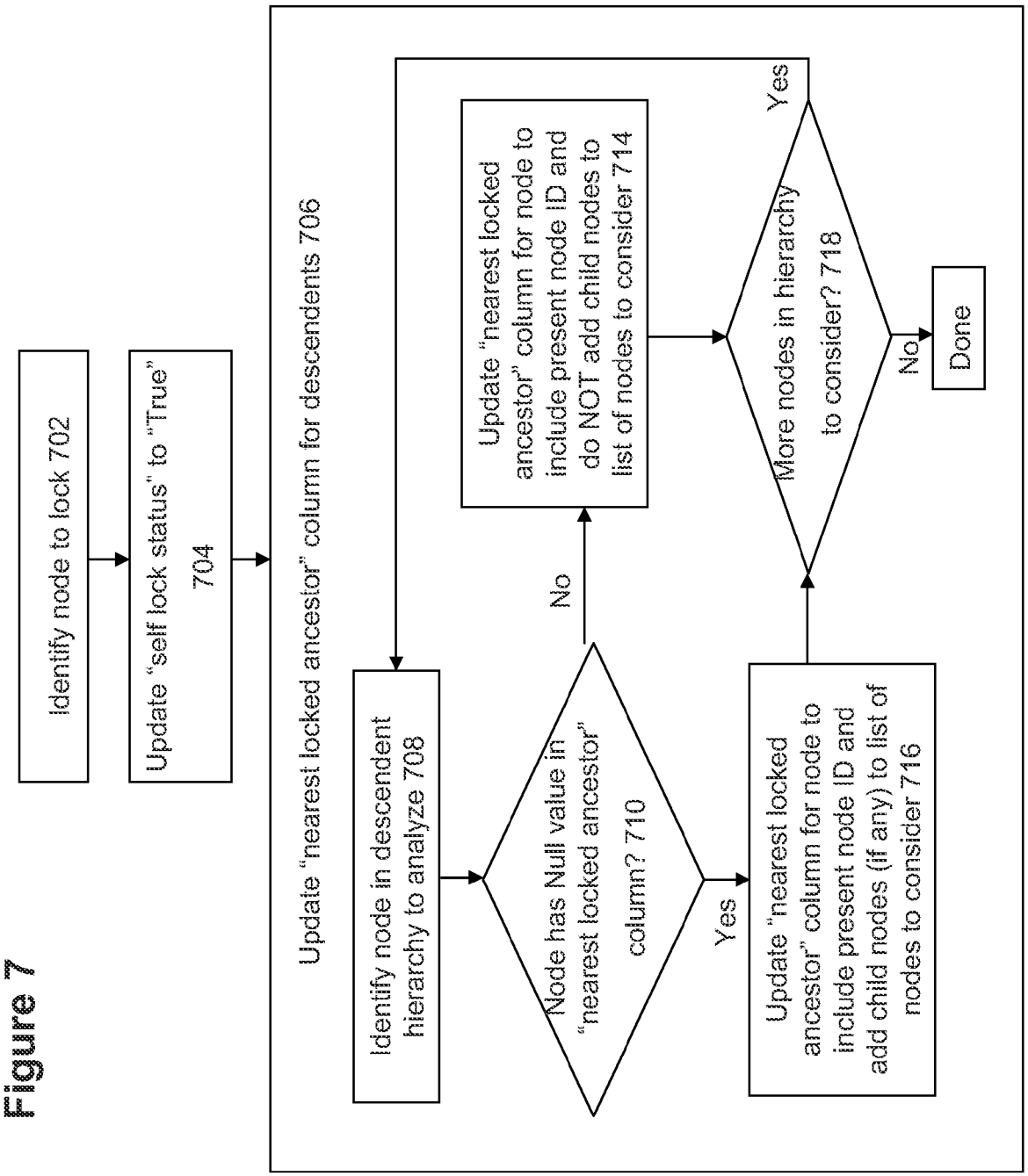

Figure 8A

| Node ID | Nearest Locked Ancestor | Self Lock |
|---|---|---|
| A1 | Null | 0 |
| B1 | Null | 0 |
| B2 | Null | 0 |
| C1 | Null | 0 |
| C2 | Null | 0 |
| D1 | Null | 0 |
| D2 | Null | 0 |

Figure 8B

| Node ID | Nearest Locked Ancestor | Self Lock |
|---------|------------------------|-----------|
| A1      | Null                   | 0         |
| B1      | Null                   | 0         |
| B2      | Null                   | 0         |
| C1  | Null                   | 0         |
| C2      | Null                   | 0         |
| D1      | Null                   | 0         |
| D2      | Null                   | 0         |

Identify Node C1 to lock

Figure 8C

| Node ID | Nearest Locked Ancestor | Self Lock |
|---------|-------------------------|-----------|
| A1      | Null                    | 0         |
| B1      | Null                    | 0         |
| B2      | Null                    | 0         |
| C1      | Null                    | 0 → 1 |
| C2      | Null                    | 0         |
| D1      | Null                    | 0         |
| D2      | Null                    | 0         |

Change Self-lock status from "0" to "1"

Update value for C1 from Null to C1. Since value was previously Null, identify and add C1's direct children in hierarchy to list of nodes to consider

Figure 8E

| Descendent Hierarchy List for C1 |
|---|
| D1 |
| D2 |

| Node ID | Nearest Locked Ancestor | Self Lock |
|---|---|---|
| A1 | Null | 0 |
| B1 | Null | 0 |
| B2 | Null | 0 |
| C1 | C1 | 1 |
| C2 | Null | 0 |
| D1 | Null → C1 | 0 |
| D2 | Null → C1 | 0 |

Since all descendents nodes have Null values in the "nearest Locked ancestor" column, update values to C1. D1 and D2 do not have any child nodes, so do not add to node list.

Figure 8F

| Node ID | Nearest Locked Ancestor | Self Lock |
|---|---|---|
| A1 | Null | 0 |
| B1 | Null | 0 |
| B2 | Null | 0 |
| C1 | C1 | 1 |
| C2 | Null | 0 |
| D1 | C1 | 0 |
| D2 | C1 | 0 |

Figure 9A

| Node ID | Nearest Locked Ancestor | Self Lock |
|---|---|---|
| A1 | Null | 0 |
| B1 | Null | 0 |
| B2 | Null | 0 |
| C1 | C1 | 1 |
| C2 | Null | 0 |
| D1 | C1 | 0 |
| D2 | C1 | 0 |

Identify Node B1 to lock

Figure 9B

| Node ID | Nearest Locked Ancestor | Self Lock |
|---------|------------------------|-----------|
| A1 | Null | 0 |
| B1 | Null | 0 → 1 |
| B2 | Null | 0 |
| C1 | C1 | 1 |
| C2 | Null | 0 |
| D1 | C1 | 0 |
| D2 | C1 | 0 |

Change Self-lock status from "0" to "1"

Figure 9C

| Node ID | Nearest Locked Ancestor | Self Lock |
|---|---|---|
| A1 | Null | 0 |
| B1 | Null → B1 | 1 |
| B2 | Null | 0 |
| C1 | C1 | 1 |
| C2 | Null | 0 |
| D1 | C1 | 0 |
| D2 | C1 | 0 |

| Node List to consider |
|---|
| B1 |

Node B1 has Null value in the "nearest Locked ancestor" column, therefore update value to B1

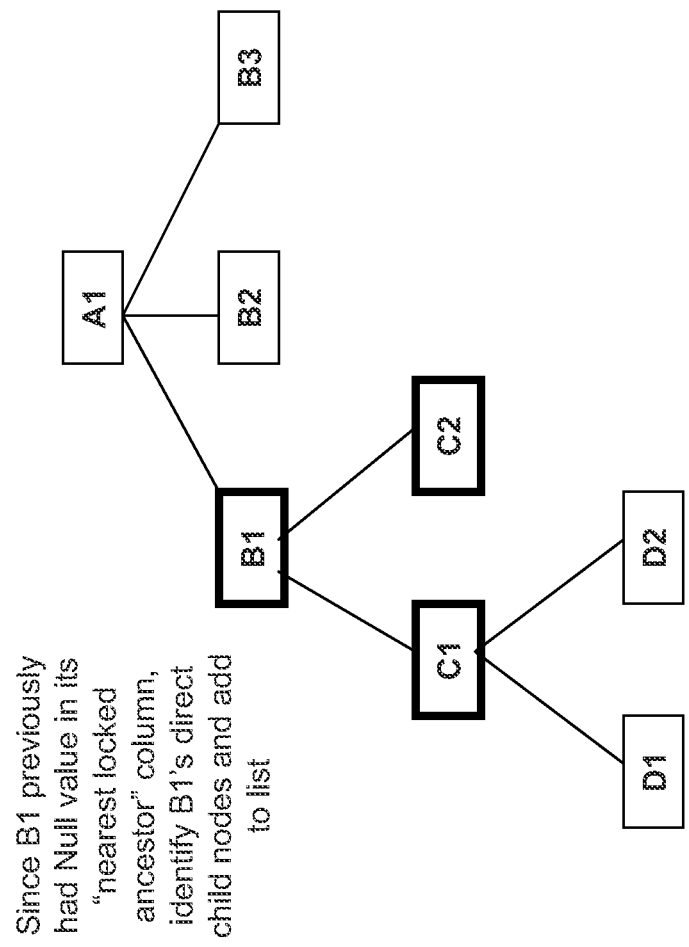

Figure 9E

| Node ID | Nearest Locked Ancestor | Self Lock |
|---|---|---|
| A1 | Null | 0 |
| B1 | B1 | 1 |
| B2 | Null | 0 |
| C1 | C1 | 1 |
| C2 | Null → B1 | 0 |
| D1 | C1 | 0 |
| D2 | C1 | 0 |

| Node List to consider |
|---|
| C1 |
| C2 |

Node C2 has Null values in the "nearest Locked ancestor" column, therefore update value to B1. C2 does not have any children, so do not add anything to list of nodes to consider

| Node ID | Nearest Locked Ancestor | Self Lock |
|---------|-------------------------|-----------|
| A1 | Null | 0 |
| B1 | B1 | 1 |
| B2 | Null | 0 |
| C1 | C1 → B1 | 1 |
| C2 | B1 | 0 |
| D1 | C1 | 0 |
| D2 | C1 | 0 |

| Node List to consider |
|-----------------------|
| C1 |

Node C1 has a non-Null values in the "nearest Locked ancestor" column, therefore update value to B1. C1 has child nodes, but do not add any child nodes from C1 to list

Figure 9G

| Node ID | Nearest Locked Ancestor | Self Lock |
|---|---|---|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

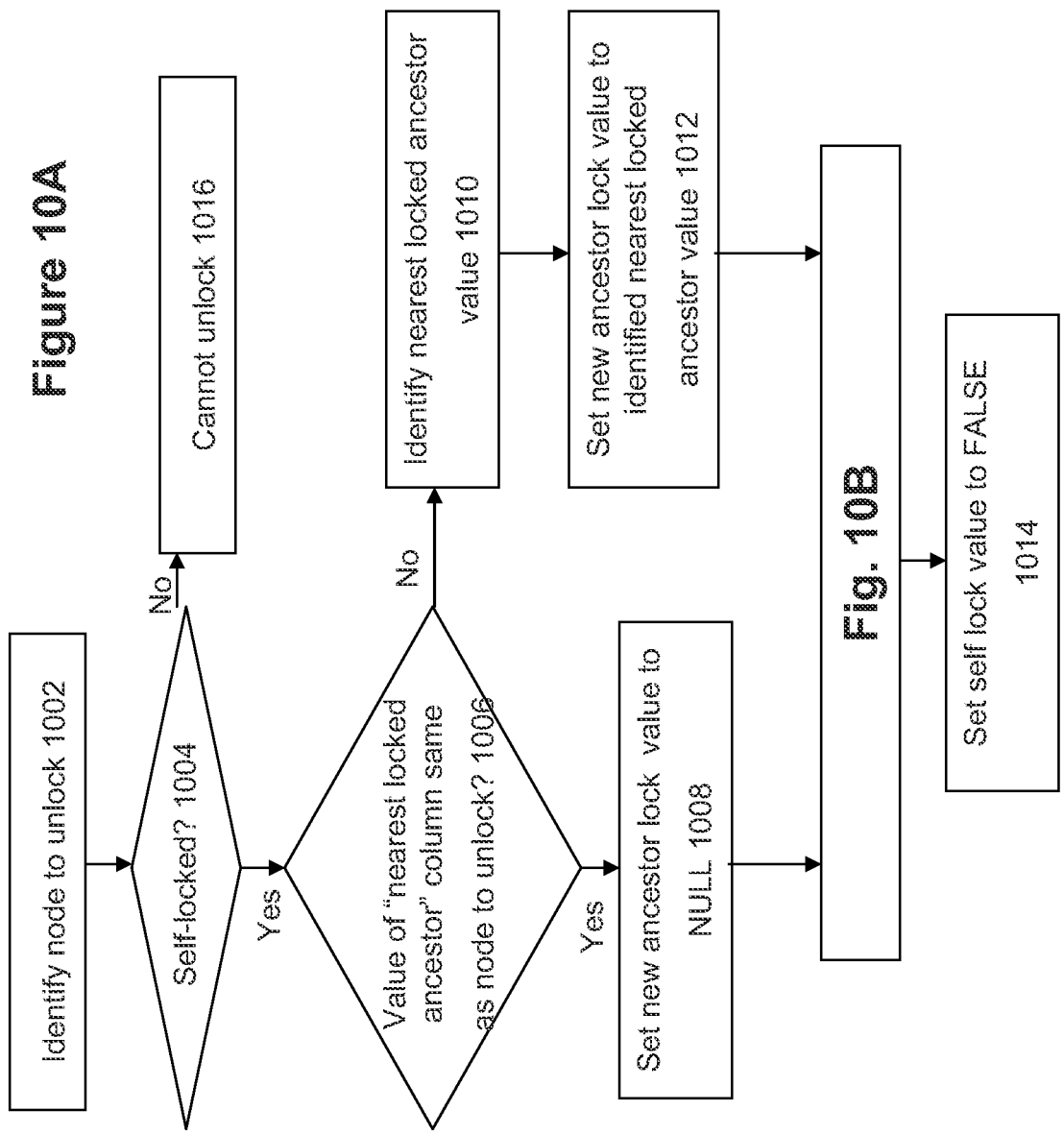

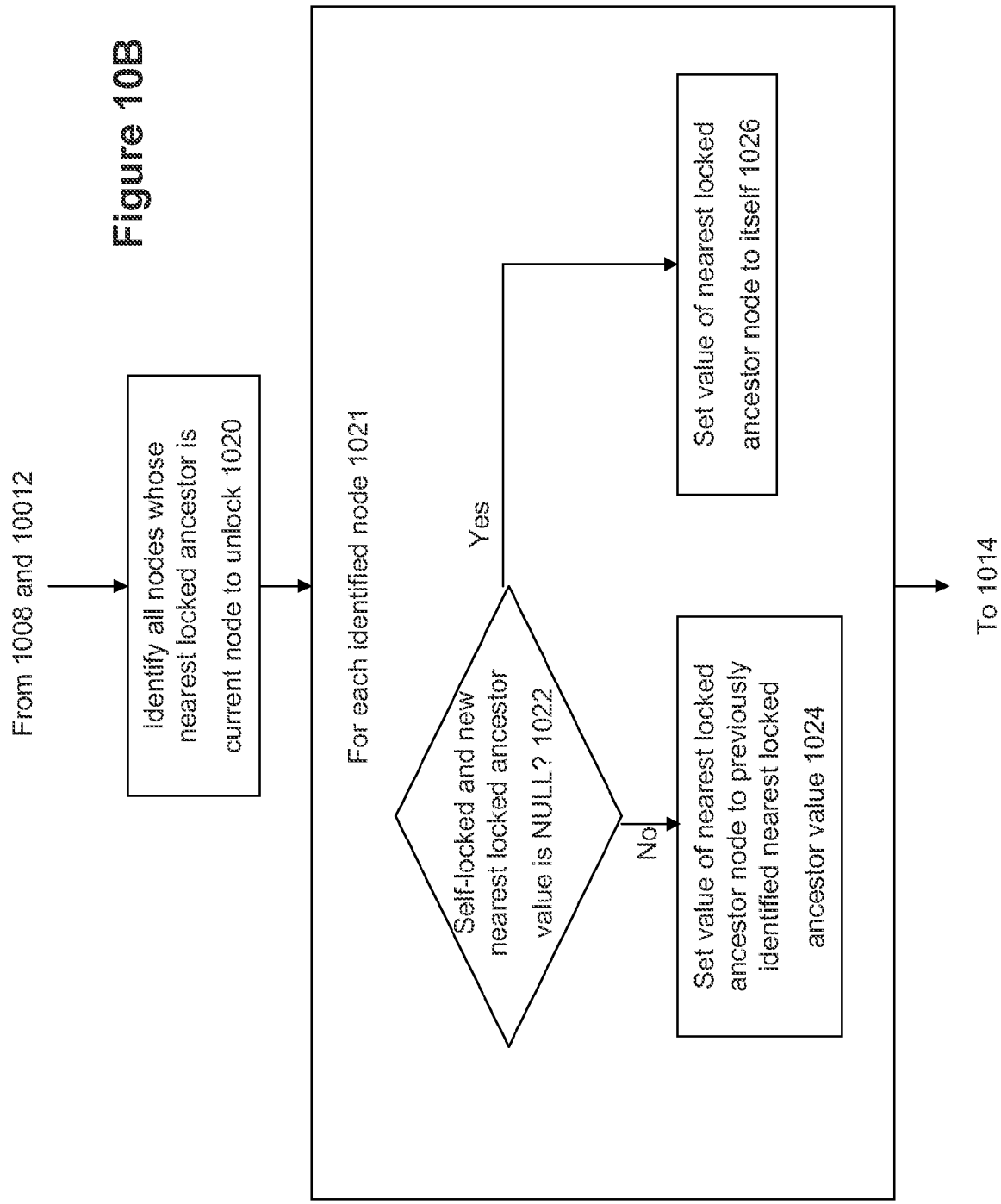

Figure 11A

| Node ID | Nearest Locked Ancestor | Self Lock |
|---|---|---|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

Identify node B1 to unlock

Figure 11B

| Node ID | Nearest Locked Ancestor | Self Lock |
|---|---|---|
| A1 | Null | 0 |
| B1 | Null | 1 |
| B2 | Null | 0 |
| C1 | B1 | 1 |
| C2 | B1 | 0 |
| D1 | C1 | 0 |
| D2 | C1 | 0 |

Verify that B1 is self locked

Figure 11C

| Node ID | Nearest Locked Ancestor | Self Lock |
|---|---|---|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

Verify that nearest locked ancestor is itself. Set new ancestor lock value to "Null"

Figure 11D

| Node ID | Nearest Locked Ancestor | Self Lock |
|---|---|---|
| A1 | Null | 0 |
| B1 | B1 | 1 |
| B2 | Null | 0 |
| C1 | B1 | 1 |
| C2 | B1 | 0 |
| D1 | C1 | 0 |
| D2 | C1 | 0 |

Identify all child nodes that have B1 as nearest locked ancestor

Figure 11E

| Node ID | Nearest Locked Ancestor | Self Lock |
|---------|------------------------|-----------|
| A1 | Null | 0 |
| B1 | B1 | 1 |
| B2 | Null | 0 |
| C1 | B1 → C1 | 1 |
| C2 | B1 | 0 |
| D1 | C1 | 0 |
| D2 | C1 | 0 |

Since C1 is self-locked, change value to itself

Figure 11F

| Node ID | Nearest Locked Ancestor | Self Lock |
|---------|-------------------------|-----------|
| A1 | Null | 0 |
| B1 | B1 | 1 |
| B2 | Null | 0 |
| C1 | C1 | 1 |
| C2 | B1 → Null | 0 |
| D1 | C1 | 0 |
| D2 | C1 | 0 |

Since C2 is not self-locked, change value to NULL

Figure 11G

| Node ID | Nearest Locked Ancestor | Self Lock |
|---|---|---|
| A1 | Null | 0 |
| B1 | B1 | 1 |
| B2 | Null | 0 |
| C1 | C1 | 1 |
| C2 | Null | 0 |
| D1 | C1 | 0 |
| D2 | C1 | 0 |

METHOD AND SYSTEM FOR EFFICIENT ENFORCEMENT OF DERIVED LOCKS IN A HIERARCHICAL STRUCTURE

FIELD

The invention relates to the field of data management and locking.

BACKGROUND AND SUMMARY

Entities often need to access one or more resources or artifacts to perform work in a computing system. Examples of such entities include users, applications, processes, tasks, and threads. At any moment in time, there may be any number of concurrent entities that seek to access the resources in a system. However, conflicts may arise if multiple entities are permitted to perform incompatible accesses to the same resources at the same time.

To prevent conflicts from occurring, mechanisms may be implemented to manage the type, number, and/or ordering of accesses that are permitted to resources in the system. A common mechanism that is used to synchronize and manage access to resources in computing and database systems is referred to as a "lock". A lock is a data structure that indicates whether or which particular entities have been granted rights to a resource. An entity must acquire a lock to a resource before the entity is permitted to access the resource. The scope of possessory or access rights granted to an entity for a particular resource is often related to the type of work that the entity intends to perform upon that resource. For example, an "exclusive lock" could be granted to an entity that seeks to access a data item in a way that is incompatible with concurrent access by other entities, e.g., to modify, write or delete the data item. The exclusive lock therefore grants exclusive access to the data item, which prevents other entities from being able to concurrently access the same data item at the same time. This type of lock essentially serializes access to its corresponding resource. A "shared lock" could be granted if an entity wishes to perform activities upon a resource which can also be concurrently performed with activities by other entities upon the same resource without introducing conflicts or inconsistencies to the data, e.g., to read a data item. Therefore, the shared lock can be concurrently granted to multiple entities for the same resource at the same time. Depending upon the exact configuration of the computing or database system, other types of locks and lock scopes can be implemented to manage access to data.

In a collaboration environment where multiple users are actively creating and modifying artifacts/resources in a highly concurrent manner, the mechanism of locking provides a valuable way to ensure that changes from one user are not overwritten by another user inadvertently.

The issue addressed by the present invention relates to locking of resources that fit within a hierarchical structure, where nodes in the hierarchical structure may have parent or child nodes. The root node has zero parent nodes, while child nodes will have at least one parent node. There may be entire chains of multi-level relationships in the hierarchy as each node may have descendents nodes that themselves have their own descendent nodes.

Consider the example hierarchical structure of FIG. 1, which includes a root node A1 having zero parent nodes, but having three direct child nodes B1, B2, and B3. Node B1 has its own direct child nodes C1 and C2. C1 has direct child nodes D1 and D2. In this example, A1 is an "ancestor" to all other nodes in the hierarchy. B1 is an ancestor to nodes C1, C2, D1, and D2. C1 is an ancestor to nodes D1 and D2.

A real-world example of such a hierarchical structure would be a file system with a folder hierarchy, where parent nodes correspond to directories and leaf nodes correspond to either files or directories. For example, D1 and D2 may correspond to files in a file system, with C1 being a directory that includes files D1 and D2. B1 is a directory that includes directory C1, and A1 correspond to a root directory that includes subdirectory B1.

With hierarchical structures, locking is often intended to have effects that transcend multiple hierarchical levels. For example, a lock on a parent node may have the effect of locking its descendent nodes.

Many content management systems and collaboration systems provide locking of artifacts and resources for hierarchical structures. However, conventional systems are limited in that they provide locking support only for leaf nodes in the hierarchical structure. For instance, in a content management system, locking support is provided for individual documents, but not for folders. This is fairly limiting in scenarios where users want to operate on the entire folder, e.g., to perform activities such as re-organizing content or populating large amounts of content in a given folder.

The invention is directed to an improved approach for handling locks and locking for hierarchical structures. Some embodiments of the present invention present a method, system, and computer program product for efficiently capturing lock information for hierarchical nodes as well as for the enforcement of derived locks. Support is provided for locking of leaf nodes as well as for locking of intermediate nodes.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 3 illustrates an example locking structure.

FIG. 5 shows a flowchart of a process for identifying a list of effective locks for a node.

FIGS. 6A-H illustrate the process of FIG. 5.

FIG. 7 shows a flowchart of a process for locking a node.

FIGS. 8A-F and 9A-G illustrate the process of FIG. 7.

FIGS. 10A-B show flowcharts of a process for unlocking a node.

FIGS. 11A-G illustrate the process of FIGS. 10A-B.

DETAILED DESCRIPTION

The invention is directed to an improved approach for handling locks and locking for hierarchical structures. Some embodiments of the present invention present a method, system, and computer program product for efficiently capturing lock information for hierarchical nodes as well as for the enforcement of derived locks. Support is provided for locking of leaf nodes as well as for locking of intermediate nodes.

One of the challenges in providing support for locking of intermediate nodes is the need to enforce locking on descendant artifacts of the locked node, i.e., inherited or derived locks on artifacts contained deeper in the hierarchy below the locked node. This enforcement needs to be extremely efficient as the check is performed at run-time when an attempt is made to modify an artifact. It is also imperative that the system scales with large hierarchies—both during the act of acquiring a lock on an intermediate node with many descendants as well as during the enforcement of locks on a descendant artifact.

According to some embodiments, the invention is implemented by maintaining a set of information that tracks "self-locks" and "derived locks" for nodes in the hierarchy. A "self-lock" refers to a lock that is directly applied on a node, e.g., if a lock is directly placed on C1 of FIG. 1, then C1 is self-locked. A "derived-lock" is a lock on a node that is propagated or inherited from one of its ancestor nodes. For example, if C1 is locked, then its child nodes D1 and D2 have derived locks based upon the lock on C1. By tracking and maintaining this information, very efficient checks can be made to determine whether a given node is locked and to determine the list of effective locks that exist for that node.

Figure 1:
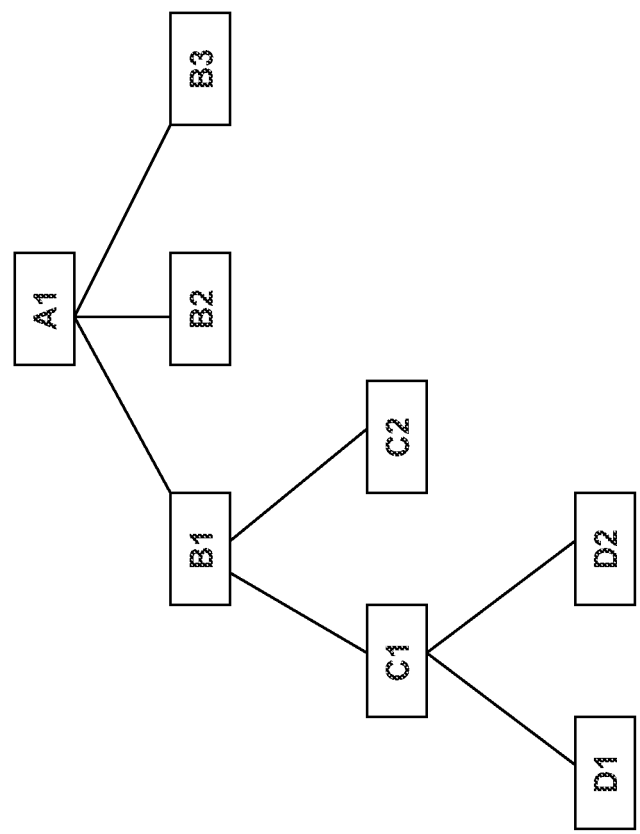
FIG. 1 illustrates an example hierarchical structure.
Figure 2:
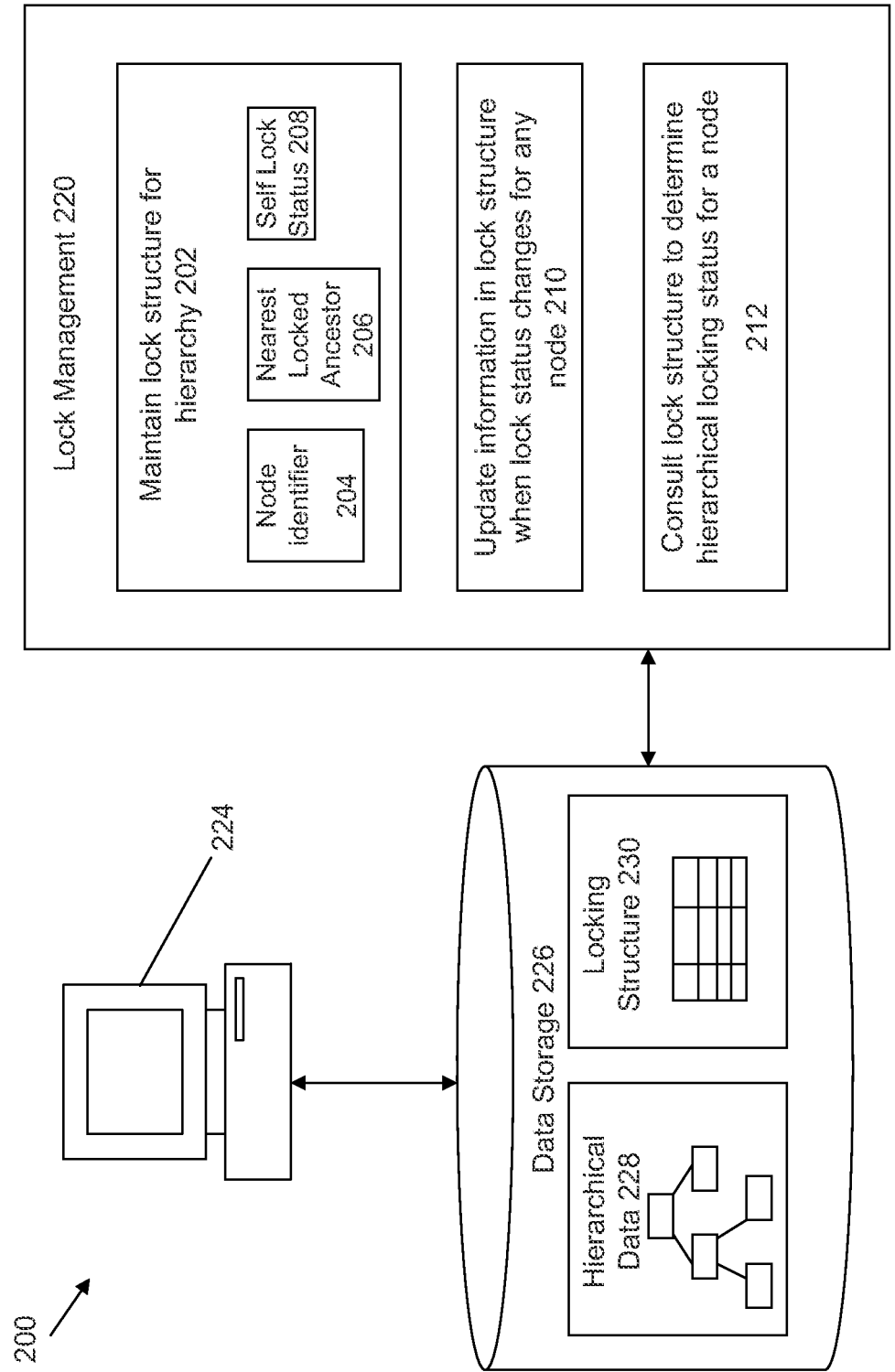
FIG. 2 illustrates an example system for managing locks for hierarchical data.

FIG. 1 provides a high level illustration of a system 200 for managing locks for hierarchical structures according to some embodiments of the invention. System 200 may include one or more users at one or more user stations 224 that operate the system 200 to access hierarchal data 228 that may be stored in a data storage device 226. Hierarchal data 228 may correspond to any type of data so long as it is associated with a hierarchical structure. For example, hierarchal data 228 may correspond to a file system having directories and files, or may correspond to any hierarchal data that is managed by a content management systems or collaboration system.

User station 224 comprises any type of computing station that may be used to access, operate, or interface with data storage device 226, whether directly or remotely over a network. Examples of such user stations 224 include for example, workstations, personal computers, or remote computing terminals. User station 224 comprises a display device, such as a display monitor, for displaying processing results or data to users at the user station 224. User station 224 also comprises input devices for a user to provide operational control over the activities of some or all of system 200.

Lock management 220 provides management for some or all of the locking functionality utilized in system 200. Using mechanism 202, lock management 220 maintains the locking structure 230 that is generated for the hierarchal data 228. Mechanism 210 updates information in the lock structure 230 as needed when there is a need for a lock status change for a node in the hierarchical data 228. Mechanism 212 is utilized to check the lock structure 230 to determine the locking status and lock information for nodes in the hierarchical data 228.

In a present embodiment, locking structure 230 comprises a table having the following schema:

| Node Identifier | Node ID of Nearest Locked Ancestor | Self Lock Status |
| --- | --- | --- |

The "Node Identifier" column provides the ID of a node in the hierarchy that is corresponds to that row in the table.

The "Node ID of Nearest Locked Ancestor" column provides the ID of the closest self-locked ancestor node. According to one embodiment, the value in this column may be the ID of the current node, an ancestor node, or Null. A Null value indicates that the node is unlocked. A value of an ID for ancestor node indicates that the node has a derived lock from at least one ancestor. A value of the ID for the present node indicates that the node has a self lock and has no derived locks from any ancestors.

The "Self Lock Status" column identifies whether the node is self locked. In one embodiment, a value of "1" indicates that the node is self-locked and a value of "0" indicates that the node is not self-locked.

To illustrate, consider again the example hierarchical structure of FIG. 1, which includes a root node A1 having zero parent nodes, but having three direct child nodes B1, B2, and B3. Node B1 has its own direct child nodes C1 and C2. C1 has direct child nodes D1 and D2.

FIG. 3 shows an example lock structure table that may be maintained for this hierarchy. Each node in the hierarchy corresponds to a separate row in the lock structure table. Therefore, all of the nodes A1, B1, B2, C1, C2, D1, and D2 in the hierarchy of FIG. 1 correspond to a separate row in the table of FIG. 3. The "Node ID" column of the table identifies the node that corresponds to each row.

The "Nearest Locked Ancestor" column identifies whether a node is locked, and if so, the identity of the nearest ancestor that is self locked. Here, A1 and B2 both have a "Null" value in this column. This indicates that neither of these nodes is locked. Nodes D1 and D2 both have the value "C1" in this column. This indicates that node C1 is the nearest self-locked ancestor to nodes D1 and D2. Nodes C1 and C2 both have the value "B1" in this column. This indicates that node B1 is the nearest ancestor node that is self-locked. Node B1 has the value "B1" in this column. This indicates that there are no ancestor nodes to B1 that are locked.

The value of the "Nearest Locked Ancestor" column can be used to determine whether a node corresponds to a derived lock. If the value of the column is the same as the current node, then the node is not associated with a derived lock. In the present example, node B1 is not associated with a derived lock (since the value of the column is the ID f other current node indicating that there are no locked ancestor nodes). If, however, the value of the column is the ID of an ancestor node, then the current node is associated with at least one derived lock from an ancestor. In this example, node C1 has the value "B1" in the column, indicating that C1 is associated with a derived lock based upon a lock on its ancestor node B1.

A node may be associated with multiple levels of derived locks based upon self-locks that exist for multiple ancestors in the hierarchy. In the present example, nodes D1 and D2 has the value "C1" in the "Nearest Locked Ancestor" column, indicating that nodes D1 and D2 have derived locks based upon a self lock on node C1. However, since C1 itself is subject to a derived lock based upon a self lock on parent node B1, that lock on B1 also acts as a derived lock on descendent grandchildren nodes D1 and D2.

The "Self Lock" column identifies whether or not a node is self locked. In the present example, nodes A1, B2, C2, D1, and D2 have a "0" or Boolean "False" value in this column. This indicates that none of these nodes are self-locked. Nodes B1 and C1 have a "1" or Boolean "True" value in this column. This indicates that nodes B1 and C1 are self locked.

A node can be associated with both a self-lock and a derived-lock. In the present example, node C1 has both a self lock and a derived lock based upon the lock on ancestor node B1.

Maintaining a locking structure as illustrated in FIG. 3 allows very efficient processing by a lock management system to determine whether or not a given node in a hierarchy is locked.

Figure 4:
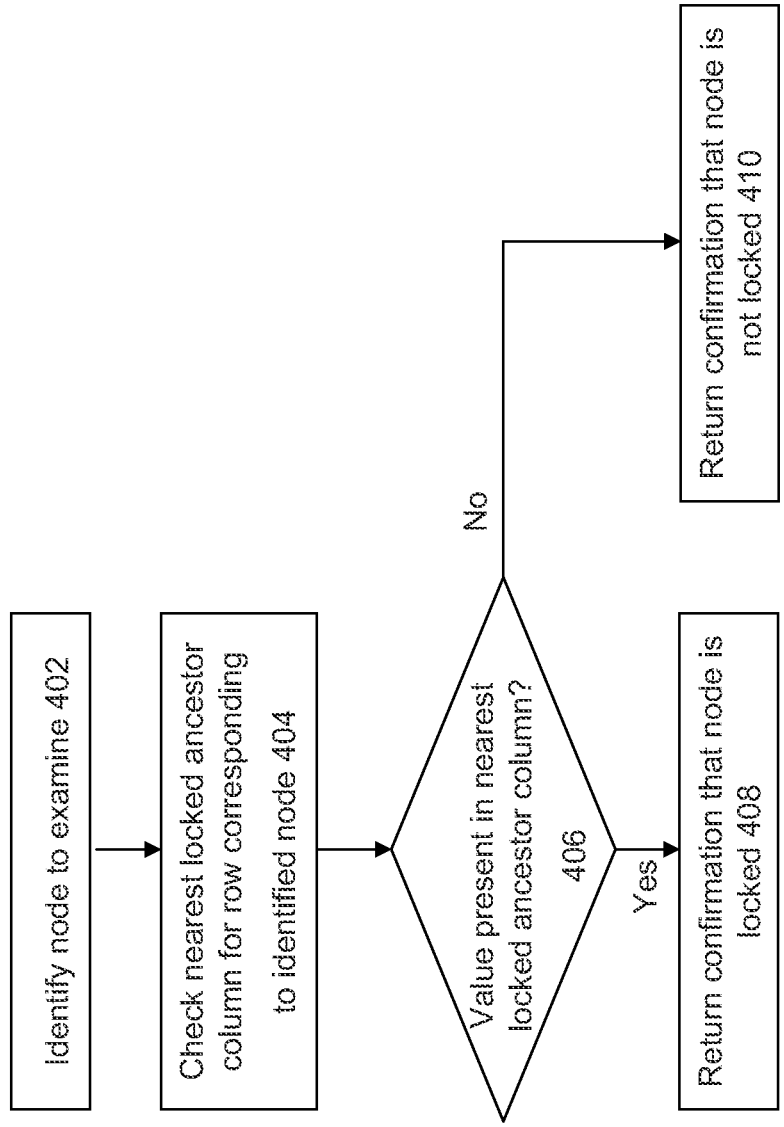
FIG. 4 shows a flowchart of a process for confirming whether or not a node is locked.

FIG. 4 shows a flowchart of a process for finding out if a given node is locked. The process begins at 402 by identifying a node to examine for purposes of determining whether it is locked. For example, assume that a user in a concurrent management system needs to perform some type of change or modification to files or directories in a file system. The file or directory on which it is desired to make the modification would be the node that is identified at 402. The locking structure table of FIG. 3 would be accessed to find the row that corresponds to the node identified at 402.

At 404, the value of the "nearest locked ancestor" column for that row is checked. A determination is made at 406 whether there is a value in the "nearest locked ancestor" column for the node.

If there is a value in the column, then this means that the node is locked. Therefore, at 408, a confirmation is returned to indicate that the node is locked.

If there is no value in the column (e.g., there is a "Null" in the column), then this means that the node is not locked. Therefore, at 410, a confirmation is returned indicating that the node is not locked.

The present invention can also be used to very efficiently identify all the effective locks on a given node. This is very useful, for example, when there is a need to identify all of the locks on a node so that they can be released to allow an entity to obtain access to that node.

According to some embodiments of the invention, the effective locks on a node would be identified based upon a walk up on the table with the ID of the nearest locked ancestor as the step. FIG. 5 shows a flowchart of a process for identify the effective locks on a node according to some embodiments. The process begins at 502 by identifying a node to examine for purposes of determining its effective locks. The lock structure table would be accessed to find the row that corresponds to the node identified at 502. At 504, the value of the "nearest locked ancestor" column for that row is checked. A determination is made at 506 whether there is a value in the "nearest locked ancestor" column for the node.

If the value in the "nearest locked ancestor" column for the node is Null, then at 520 the list of effective locks that has already been compiled based upon a prior iteration of the process is returned at 520. If the Null value is encountered in the first iteration of the process (for the node identified in 502), this means that the node is not locked and therefore there should be no effective locks on the node (and in the list to be reported). If, however, multiple iterations are performed for the process, this means that there is least one (and maybe more) effective locks on the node to be reported from the list.

If the value in the "nearest locked ancestor" column for the node is not Null, then at 508, the Node ID value that is in the column is added to a list of effective locks, if that value is not already on the list.

A determination is made at 510 whether the ID value in the column is the same as the current node ID. If so, this means that the node currently under examination does not have any further ancestor nodes. Therefore, the process proceeds to 520 to return the list of effective locks on the node.

If, however, the ID value in the column is not the same as the current node, then the process, at 514, walks up the hierarchy to the row corresponding to the node ID value that is in the column. The process then iterates the previously described actions until there are no further ancestor locks to identify as an effective lock.

To illustrate this process, consider the lock structure table shown in FIG. 6A. Assume that is desired to identify the effective locks on node D2. An "effective lock list" is maintained to track the effective locks on this node. The row that corresponds to this node D2 is first accessed, and as shown in FIG. 6B, the value of the "nearest locked ancestor" column for that row is checked to identify its value.

Here the value in the "nearest locked ancestor" column for the row corresponding to D2 is "C1". This column value is not Null. Therefore, as shown in FIG. 6C, the column value of C1 is added to the effective lock list.

A determination is made whether the value in the "nearest locked ancestor" column, i.e., "C1", is the same as the ID of the node currently under examination, i.e., "D2". As is evident, "C1" is not the same value as "D2." Therefore, as shown in FIG. 6D, the process walks to the row corresponding to the value in the column, i.e., by walking to the row for node C1.

The row that corresponds to node C1 is accessed, and as shown in FIG. 6E, the value of the "nearest locked ancestor" column for that row is checked to identify its value. Here the value in the "nearest locked ancestor" column for the row corresponding to C1 is "B1". Since this column value is not Null, then as shown in FIG. 6F, the column value of B1 is added to the effective lock list.

A determination is made whether the value in the "nearest locked ancestor" column, i.e., "B1", is the same as the ID of the node currently under examination, i.e., "C1". Here, ID values are not the same since "B1" and "C1" are not the same values. Therefore, as shown in FIG. 6G, the process walks to the row corresponding to the value in the column, i.e., by walking to the row for node B1.

Figure 6H:
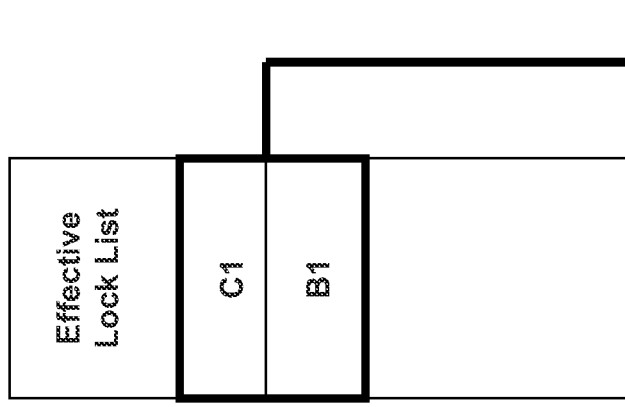

The row that corresponds to node B1 is accessed, and as shown in FIG. 6H, the value of the "nearest locked ancestor" column for that row is checked to identify its value. Here the value in the "nearest locked ancestor" column for the row corresponding to B1 is also "B1". This column value is not Null, but it is not added to the effective lock list since it already exists in the list.

A determination is made whether the value in the "nearest locked ancestor" column, i.e., "B1", is the same as the ID of the node currently under examination, i.e., "B1". Here, since the ID values are exactly the same, the process ends since there are no further locked ancestor nodes. Therefore, the list of effective locks in the effective lock list can be returned. In the present example, this means that the list of effective locks for node D2 includes locks on ancestor nodes C1 and B1.

This example highlights a particular advantage of embodiments of the invention. The process for identifying effectively locks does not need to walk through each and every node in the hierarchy. Instead, the process is implemented such that it only needs to jump to specific nodes in the hierarchy that correspond to self locks. This provides a highly significant improvement in performance since only a limited number of nodes needs to be checked to identify the list of effective locks.

Next, this document will describe how the lock status table is updated when performing an operation to either lock or unlock a node. According to some embodiments, when a node is locked, the "nearest locked ancestor" column for all of its direct descendents is updated with the ID of the node being locked. The update is stopped if the update process encounter a node which itself is locked, e.g., if the Node ID column value and the nearest locked ancestor column value are the same.

FIG. 7 illustrates a flowchart of a process for locking a node according to some embodiments of the invention. The process begins at 702 by identifying a node in the hierarchy to lock. In the row of the lock status table associated with this node, the self lock status column is updated at 704 to indicate that the node is self-locked.

Next, at 706, a process is performed to update the "nearest locked ancestor" column as appropriate for the descendents of the node identified at 702. At 708, identification is made of a descendent node to process. At the initial stage, the identified node would be a direct child node from the node identified at 702. Subsequent iterations of this process may cause descendent nodes at even lower levels of the hierarchy to be identified and processed at 708.

A determination is made at 710 as to whether the "nearest locked ancestor" column for the node identified in 708 has a node ID value. If not, e.g., the column has a Null value, then at 714 the "nearest locked ancestor" column is updated with the node ID from 702, and any descendent nodes from the node identified in 708 will be placed on a list of nodes that will undergo this same process in a subsequent iteration. This is because those descendent nodes may need to be updated to indicate that they will have a derived lock as well as the ID of the ancestor node causing the derived lock.

If, however, the column does have a node ID value, then at 716 the "nearest locked ancestor" column is updated with the node ID from 702, and any descendent nodes from the node identified in 708 will not be processed any further. Instead, those descendent nodes will maintain their existing values in their respective "nearest locked ancestor" columns. This is because this situation indicates that the node has a self-lock, and therefore the nearest locked ancestor for those descendent nodes will be the present node under examination identified in 708. As such, it will be unnecessary to change the nearest locked ancestor column values for those nodes.

At 718, a determination is made whether there are further nodes in the hierarchy that need to be processed. If so, then the process iterates through the above-described actions to process those additional nodes.

To illustrate this process, reference is made to the lock structure table shown in FIG. 8A. This table corresponds to the hierarchy of FIG. 1, but is displayed at a point in time in which there are no locks on any nodes. As such, all of the values in the nearest locked ancestor column is Null.

Assume that it is desired to lock node C1. As shown in FIG. 8B, the process will access the row associated with this node. The "self lock" column for this row will be updated to indicate that a lock is being placed directly on this node. In the present example, a value of "1" indicates the presence of a self lock. As such, this value of "1" is placed in the self lock column for node C1 as shown in FIG. 8C.

The "nearest locked ancestor" column will also be updated to reflect the fact that node C1 is locked. Here, since C1 has a Null value in this column, the column will be updated to include "C1" identifier value to indicate that the node is locked and that its nearest locked ancestor is itself. This is shown in FIG. 8D.

Figure 8D:
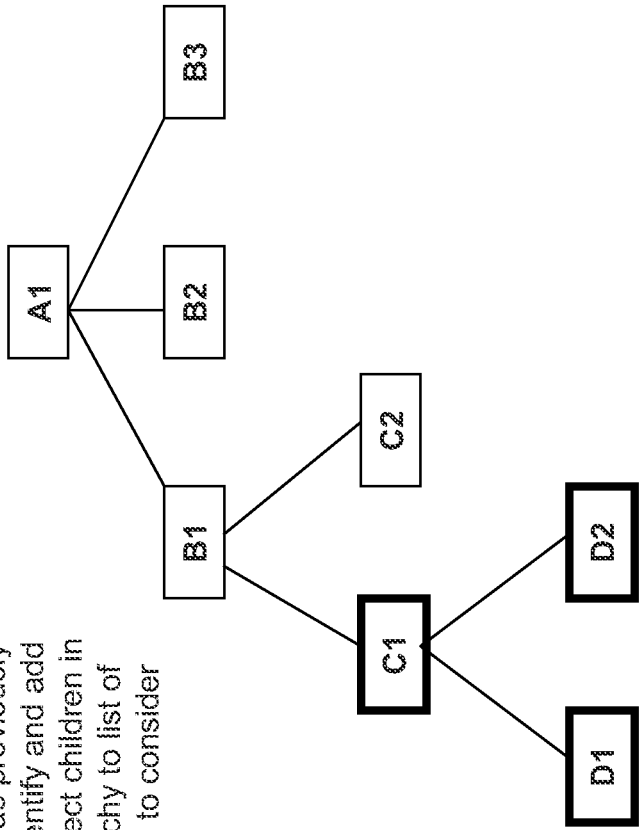

Also shown in FIG. 8D, the direct child nodes from C1 will be identified and placed on a list for processing. Here, it can be seen that the direct child nodes from node C1 are nodes D1 and D2. Therefore, each of nodes D1 and D2 will be iteratively processed for updating.

FIG. 8E shows the results of processing the child nodes D1 and D2. Since each of these child nodes have a Null value in the "nearest locked ancestor" column, those columns will be updated with the "C1" value to indicate that these nodes are now locked, and that the nearest locked ancestor is node C1. Furthermore, the "self lock" column remains with "0" values to indicate that these nodes are not self-locked and therefore have derived locks from one or more ancestor nodes. FIG. 8F shows the final version of the lock status table after completing the lock updates.

Assume that there is a further desire to lock node B1. As shown in FIG. 9A, the process will access the row associated with this node B1. The "self lock" column for this row will be updated to indicate that a lock is being placed directly on this node, as indicated by the value of "1" as shown in FIG. 9B.

The "nearest locked ancestor" column will also be updated to reflect the fact that node B1 is locked. Here, since B1 has a Null value in this column, the column will be updated to include "B1" identifier value to indicate that the node is locked and that its nearest locked ancestor is itself. This is shown in FIG. 9C.

Since the "nearest locked ancestor" column for B1 was previously Null, the direct child nodes from node B1 will be identified and placed on a list for processing. As shown in FIG. 9D, the direct child nodes from node B1 are nodes C1 and C2. Therefore, each of nodes C1 and C2 will be iteratively processed for lock updating.

Assume that node C2 is processed first. Since this node C2 has a Null value in its "nearest locked ancestor" column, this column will be updated with the "B1" value as shown in FIG. 9E to indicate that this node is now locked, and that the nearest locked ancestor is node B1. Since the starting value of the column was Null, any direct child nodes from node C2 (if they exist) would be identified and placed on the list for processing. In the present example, there are no direct child nodes, and therefore no additional nodes are placed on the list for processing. The "self lock" column for C2 remains with a "0" value to indicate that this node is not self-locked and therefore has one or more derived locks from one or more ancestor nodes.

Figure 9F:
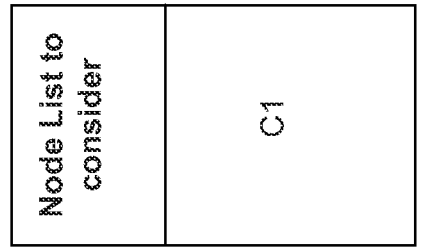

Next, node C1 will be processed. This node C1 does not have a Null value in its "nearest locked ancestor" column. This column will be updated with the "B1" value as shown in FIG. 9F to indicate that this node is now locked, and that the nearest locked ancestor is node B1. However, since the starting value of the column was not Null, the processing ends at this node and no further child nodes from node C1 will be identified for processing. This is despite the fact that C1 does have child nodes. This is because those child nodes already had derived locks from self-locked node C1, and therefore their nearest locked ancestor is already correctly identified as being node C1. As such, those nodes do not need any further updating. FIG. 9G shows the final version of the lock status table after completing the lock updates.

This last example highlights another advantage of the invention. Lock updates do not always need to propagate throughout an entire hierarchy. Instead, if a lower portion of a hierarchy is already locked, then the locking process does not need to go through the entirety of that already-locked portion. Instead, only the highest hierarchical node in that lock portion needs to be updated.

A given node can have multiple locks of different type applied to it. Using the present embodiment, there are no appreciable effects if a lock is applied on a container that has already been locked on the above-described table. The purpose of this design was to provide an easy mechanism to determine if a container is locked, so it will not matter which type of lock it is, the approach can be used to determine whether or not it is locked. Also, since the present approach can get to the locked ancestor easily, finding out what types of lock(s) are applied on it is straightforward.

This document will now describe a process for deleting a lock on a node. Deleting a lock on a node would mean an update of its descendents with either a null (no lock) or a node id of a locked ancestor.

FIGS. 10A and 10B illustrate flowcharts of a process to delete a lock on a node. At 1002, identification is made of a node to unlock. A determination is made at 1004 whether the identified node is self locked. If there is no self-lock on the node, then it cannot be directly unlocked (although if there is a derived lock on the node, then the derived lock on the node may be unlocked by unlocking the one or more ancestor nodes having self locks). This action at 1004 is performed by checking the "self lock" column for the node to see if there is a "1" value in that column. If so, then the node is self locked. If the node is not self-locked, then the process returns at 1016.

A determination is made at 1006 whether the value of the "nearest locked ancestor" column for the node is the same as the present node being processed. If so, then this indicates that there are no locks on any ancestor nodes. As such, the new nearest locked ancestor value is set to Null. If the value of the column is not the same as the current node, i.e., it has the node ID value of an ancestor at a higher point in the hierarchy, then new nearest locked ancestor value is set to that node ID value of that self-locked ancestor.

The process then proceeds to the flowchart shown in FIG. 10B. At 1020, an identification is made of all nodes whose nearest locked ancestor is the current node being unlocked. This determination can be made by checking the "nearest locked ancestor" column of the lock status table to find all rows having the value of the current node in that column. The actions of 1021 are performed for each identified node. At 1022, a determination is made whether the node is self-locked and if the new nearest locked ancestor value was previously set to Null, then at 1026 the "nearest locked ancestor" column for the node is set to itself. Otherwise, at 1024, the "nearest locked ancestor" column for the node is set to the previously identified nearest locked ancestor value.

The process then proceeds to 1014 to set the "self lock" value for the original node to "0" or "False" to indicate that the node is no longer self locked.

To illustrate this process, consider the lock status table of FIG. 11A in which node B1 has been identified to be unlocked. As shown in FIG. 11B, the self-lock column for node B1 is checked to see if node B1 is self-locked. Here, the column value has a value of "1", indicating that node B1 is indeed self-locked.

Next, as shown in FIG. 11C, a check is made of the "nearest locked ancestor" column for node B1. In this example, the value of this column is "B1", which is the same as the present node. This means that node B1 does not have any derived locks from an ancestor node. Therefore, the new value to be set for this column is "Null" to unlock node B1, and to indicate that B1 will be completely free of any locks once the process is complete.

Referring to FIG. 11D, identification is made of all nodes that have node B1 as their nearest locked ancestor node. In the present example, nodes C1 and C2 are identified as the nodes in the hierarchy that have node B1 as their nearest locked ancestor. Each of these nodes is processed as described in the flow of FIG. 10B.

For node C1, a determination is made whether this node is unlocked and whether the previously set value for parent node B1 in the "nearest locked ancestor" column is Null. Here, as shown in FIG. 11E, the answer is yes. Therefore, the new value of the "nearest locked ancestor" column for node C1 will be set to itself, to indicate that node C1 is still locked with a self-lock, and that its nearest locked ancestor is itself.

For node C2, a determination is made whether this node is unlocked and whether the previously set value for parent node B1 in the "nearest locked ancestor" column is Null. Here, as shown in FIG. 11F, the answer is no since node C2 is not self-locked (as indicated in the "0" value in the self-lock" column for C2). Therefore, the new value of the "nearest locked ancestor" column for node C2 will be Null, to indicate that node C2 is no longer locked since the derived lock that was previously in existence from parent node B1 has been released. FIG. 11G shows the final version of the lock status table after completing the unlock updates.

What has been described is a new and very efficient way to manage and enforce locking for hierarchical data. The present embodiments provide numerous advantages. For example, the present embodiments maintain very little metadata for each of the descendant nodes of a locked ancestor node and yet manages to enforce locking on a descendant artifact in an optimal manner. This approach strikes a compromise between the efficiency of lock enforcement and the cost of metadata maintenance during lock acquisition. The advantage during lock enforcement is that the cost of enforcement is proportional to the number of locked ancestors and not to the number of ancestors—this has a significant impact on the cost of traversal up the hierarchy for lock enforcement.

System Architecture Overview

Figure 12:
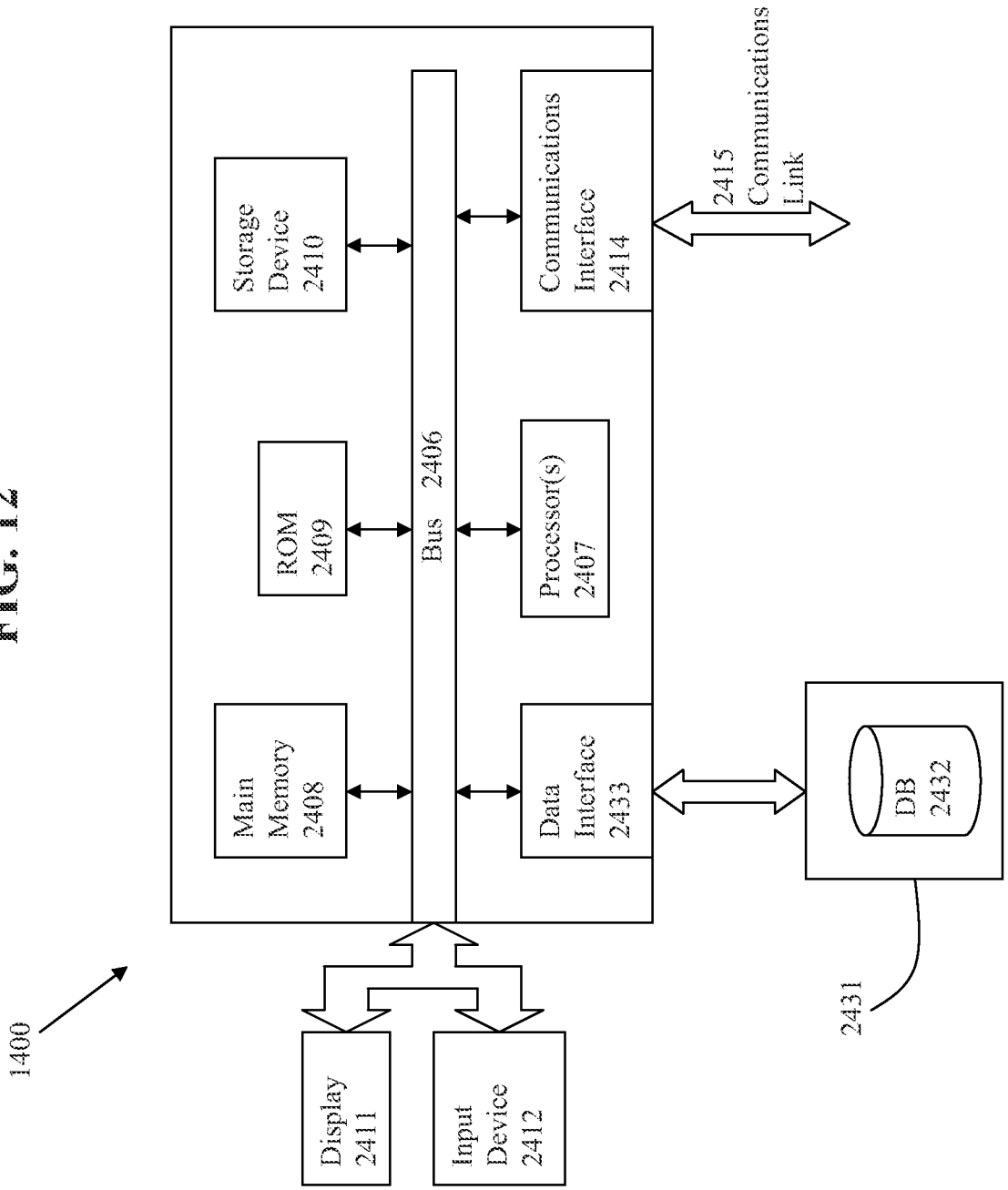
FIG. 12 depicts a computerized system on which a method for re-using digital assertions in a mixed signal context can be implemented.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for managing locks for hierarchical data using a processor, comprising:
    identifying hierarchical data to manage, wherein the hierarchical data comprises a plurality of nodes in a hierarchical structure;
    maintaining a lock structure that tracks locks for the plurality of nodes using node identifiers, nearest-locked-ancestor identifiers that identify a closest locked ancestor node for a node in the hierarchical structure that causes the node to be locked, and self lock identifiers that identify whether each of the plurality of nodes is self-locked or not; and
    accessing the lock structure to manage locking for the hierarchical data;
    wherein a node in the hierarchical structure having an ancestor node is self-locked if the node is locked without a nearest ancestor node being locked; and
    wherein a node in the hierarchical structure having an ancestor node is derived-locked if the lock is derived from an ancestor node.

2. The method of claim 1 which tracks self locks and derived locks.

3. The method of claim 1 in which the nearest-locked ancestor identifier for a node in the hierarchical structure corresponds to a nearest ancestor node for that node that is self-locked, the node in the hierarchical structure itself, or a null value.

4. The method of claim 1 in which the self lock identifier identifies whether a node is self-locked.

5. The method of claim 1 in which the nearest-locked-ancestor identifier is used to determine whether a node corresponds to a derived lock by checking whether the nearest-locked-ancestor identifier corresponds to an ancestor node.

6. The method of claim 1 in which the nearest-locked-ancestor identifier is used to determine whether a node is locked by checking the nearest-locked-ancestor identifier, wherein if the nearest-locked-ancestor identifier corresponds to a node identifier value then the node is confirmed as a locked node.

7. The method of claim 1 in which the lock structure is walked using the nearest-locked-ancestor identifiers to identify effective locks on a node.

8. The method of claim 7 in which the lock structure is walked by only walking to locked nodes.

9. The method of claim 7, comprising:
    checking whether the nearest-locked-ancestor identifier corresponds to a node identifier value;
    checking whether the nearest-locked-ancestor identifier corresponds to a current node; and
    maintaining a list of effective locks.

10. The method of claim 7 in which the lock structure is walked in a manner in which not every node is traversed.

11. The method of claim 1 in which a node is locked or unlocked by modifying the nearest-locked-ancestor identifier.

12. The method of claim 11 in which the nearest-locked-ancestor identifier is updated for direct descendants of the node being locked.

13. The method of claim 12, comprising:
    determining whether the nearest-locked-ancestor identifier for a descendent node indicates that the descendent node was unlocked;
    updating the nearest-locked-ancestor identifier for the descendent node to include an identifier for the node; and
    adding child nodes of the descendent node to a list of nodes to process if the descendent node was unlocked.

14. The method of claim 13 that is implemented iteratively.

15. The method of claim 11 to unlock a node, comprising:
    determining whether the nearest-locked-ancestor identifier for the node is the same value as the node;
    setting a new nearest-locked-ancestor identifier to indicate no locking if the nearest-locked-ancestor identifier is the same value as the node; and
    setting the new nearest-locked-ancestor identifier to be the closest self-locked ancestor if the nearest-locked-ancestor identifier is not the same value as the node.

16. The method of claim 15 further comprising:
    identifying all descendent nodes in which the nearest-locked-ancestor identifier corresponds to the node; and
    checking the descendent nodes to see if self-locking exists and if the new nearest-locked-ancestor identifier to indicate no locking, wherein the nearest-locked-ancestor identifier for each of the descendent nodes is set as itself or to the closest self-locked ancestor.

17. The method of claim 1 in which the self-lock identifier is updated to lock or unlock the node.

18. A computer program product embodied on a non-transitory computer readable medium, the computer readable medium having stored thereon a sequence of instructions which, when executed by a processor causes the processor to execute a method for managing locks for hierarchical data, the method comprising:
    identifying hierarchical data to manage, wherein the hierarchical data comprises a plurality of nodes in a hierarchical structure;
    maintaining a lock structure that tracks locks for the plurality of nodes using node identifiers, nearest-locked-ancestor identifiers that identify a closest locked ancestor node for a node in the hierarchical structure that causes the node to be locked, and self lock identifiers that identify whether each of the plurality of nodes is self-locked or not; and
    accessing the lock structure to manage locking for the hierarchical data;
    wherein a node in the hierarchical structure having an ancestor node is self-locked if the node is locked without a nearest ancestor node being locked; and
    wherein a node in the hierarchical structure having an ancestor node is derived-locked if the lock is derived from an ancestor node.

19. A computer-based system for managing locks for hierarchical data, comprising:
- a computer processor to execute a set of program code instructions;
- a memory to hold the program code instructions, in which the program code instructions comprises program code to identify hierarchical data to manage, wherein the hierarchical data comprises a plurality of nodes in a hierarchical structure, to maintain a lock structure that tracks locks for the plurality of nodes using node identifiers, nearest-locked-ancestor identifiers that identify a closest locked ancestor node for a node in the hierarchical structure that causes the node to be locked, and self lock identifiers that identify whether each of the plurality of nodes is self-locked or not, and to accessing the lock structure to manage locking for the hierarchical data, wherein a node in the hierarchical structure having an ancestor node is self-locked if the node is locked without a nearest ancestor node being locked; and wherein a node in the hierarchical structure having an ancestor node is derived-locked if the lock is derived from an ancestor node.

* * * * *

UNITED STATES PATENT AND TRADEMARK OFFICE
CERTIFICATE OF CORRECTION

PATENT NO. : 8,452,743 B2  
APPLICATION NO. : 12/562633  
DATED : May 28, 2013  
INVENTOR(S) : Vasudevan et al.

Page 1 of 1

It is certified that error appears in the above-identified patent and that said Letters Patent is hereby corrected as shown below:

In the Drawings:

On sheet 33 of 37, in figure 11D, line 8, delete "B1as" and insert -- B1 as --, therefor.

In the Specification:

In column 2, line 20-21, delete "documents," and insert -- documents --, therefor.

In column 10, line 65, delete "PTSN," and insert -- PSTN, --, therefor.

Signed and Sealed this  
Eighth Day of October, 2013

Teresa Stanek Rea  
*Deputy Director of the United States Patent and Trademark Office*